US010058993B2

(12) United States Patent
Constantine et al.

(10) Patent No.: US 10,058,993 B2
(45) Date of Patent: Aug. 28, 2018

(54) TOOL HOLDER ASSEMBLY

(71) Applicant: Acme United Corporation, Fairfield, CT (US)

(72) Inventors: Richard S. Constantine, Monroe, CT (US); Siu-Leung Tang, Hong Kong (CN)

(73) Assignee: Acme United Corporation, Fairfield, CT (US)

(*) Notice: Subject to any disclaimer, the term of this patent is extended or adjusted under 35 U.S.C. 154(b) by 115 days.

(21) Appl. No.: 15/207,913

(22) Filed: Jul. 12, 2016

(65) Prior Publication Data

US 2018/0015611 A1 Jan. 18, 2018

(51) Int. Cl.
*B60R 7/00* (2006.01)
*B25H 5/00* (2006.01)

(52) U.S. Cl.
CPC .................................... *B25H 5/00* (2013.01)

(58) Field of Classification Search
CPC ............................... B25H 5/00; B63B 25/004
USPC ....................................................... 224/406
See application file for complete search history.

(56) References Cited

U.S. PATENT DOCUMENTS 3,891,171 A * 6/1975 Samuelian ............... A21C 1/02 248/131
4,040,549 A * 8/1977 Sadler .................... B60N 3/103 215/376
5,054,733 A * 10/1991 Shields .................. B60N 3/101 248/154
5,330,145 A * 7/1994 Evans .................... B60N 3/103 224/547
5,429,265 A * 7/1995 Maire ...................... B25H 3/00 206/372
5,722,574 A * 3/1998 Pratt ......................... A45F 3/16 224/148.1
6,491,265 B2 * 12/2002 Tracy ....................... B60N 3/10 248/131
8,453,860 B2 * 6/2013 Otero ..................... B65D 23/02 215/11.3
8,757,418 B2 * 6/2014 Zimmerman ............ A47G 7/06 220/483
8,757,572 B1 * 6/2014 Starr ...................... F16M 13/02 224/556
2004/0200941 A1 * 10/2004 Dennis ................... B60N 3/102 248/311.2
2014/0217095 A1 * 8/2014 Scivoletto ............. B65D 51/24 220/212

* cited by examiner

*Primary Examiner* — Derek Battisti
(74) *Attorney, Agent, or Firm* — Alix, Yale & Ristas, LLP

(57) ABSTRACT

A tool holder assembly for a watercraft and other applications employs a base assembly which is radially expandable to engage the inner surface of a cup holder or similar structure. The upper portion of the tool holder assembly includes a container and a multitude of thin rods which engage and press against tools inserted into the container. A containment net is placed over the projecting top portions of the tools and is secured by clips which engage retainers mounted at the top portion of the container. The tool holder assembly is installed by relative rotation between the upper portion and the base assembly.

20 Claims, 6 Drawing Sheets

TOOL HOLDER ASSEMBLY

BACKGROUND

This disclosure relates generally to holders for hand tools. More particularly, this disclosure relates to the securement of tools and related articles in watercraft.

Kayaks, canoes, small light boats and related watercraft typically do not have space or physical accommodation for tools, even though tool storage on such watercraft is highly desired for certain situations. Among the significant obstacles to effective tool containment is compatibility with the existent physical structure of the watercraft, flexibility in accommodating a wide variety of tools, and the ability to ensure containment integrity should the canoe, kayak or boat capsize or experience adverse water conditions. It is also highly desirable that any tool holder can accommodate a wide variety of tools and articles and is relatively easy to use and install.

SUMMARY

Briefly stated, a tool holder assembly comprises a body. The body has an upper container having a central axis and has a lower portion mounting a rotatably fixed axially projecting screw. A base receives the lower portion and has a circumferential ring and a first ramp surface disposed about the axis. An actuator member receives the screw and is axially displaceable therealong. The actuator member has a second ramp surface which is disposed about the central axis. A plurality of expansion or clamp members have first and second following surfaces engageable with the first and second ramp members. At least one peripheral O-ring secures the expansion members to the base. The rotation between the body and the base causes the expansion members to be radially displaced and the at least one O-ring to expand or contract radially.

The container receives a multiplicity of rods. A plurality of hooks extend from the body. A net is secured to the plurality of hooks and covers the rods and received tools. The net further mounts a plurality of clips which engage the hooks.

Preferably, there are three expansion members and there are three rubber O-rings. The actuator member carries a rotatably fixed nut which threadably engages the screw. Each expansion member has at least one groove which receives a portion of an O-ring. In one embodiment, a tool holder assembly comprises a body forming an open container which receives a multitude of rods. The body mounts a plurality of angularly spaced retainers.

A radially expandable base assembly has a first portion which receives the body. The base assembly has a second portion which comprises a wedge and a plurality of radially displaceable clamp members engageable by the wedge and peripherally mounting at least one O-ring which secures the clamp members to the base assembly. A threadable member connects the body and the base assembly. A second retainer is threadably engaged to the threaded member and is axially displaceable thereon to axially move the wedge. Relative rotational movement between the body and the base assembly in a first rotational direction forces the clamp members and at least one O-ring radially outwardly and relative rotational movement between the body and the base assembly in an opposite second rotational direction allows the clamp members and the at least one O-ring to move inwardly.

In one embodiment, there are three substantially identical, radially displaceable clamp members. Each radially displaceable clamp member defines three axially spaced grooves. An O-ring is received in each of the grooves. The body has an upper rim portion. A plurality of angularly spaced hooks extend from the upper rim portion. Preferably, the threadable member is a screw and the second retainer is a nut. The base assembly further comprises an enlarged annulus having a plurality of angularly spaced serrations. The angularly spaced retainers are downwardly extending hooks. The rods are preferably received on a tray and an upper portion of the rods extend above the container.

DETAILED DESCRIPTION

With reference to the drawings wherein like numerals represent like parts throughout several figures, a tool holder assembly is generally designated by the numeral 10. The tool holder assembly 10 is adapted for installation in a watercraft, such as a kayak, a canoe, and a small lake boat, for holding various tools, including knives, fishing tackle, and other articles. The tool holder assembly 10 can also be employed in numerous applications other than those associated with watercraft.

Figure 1:
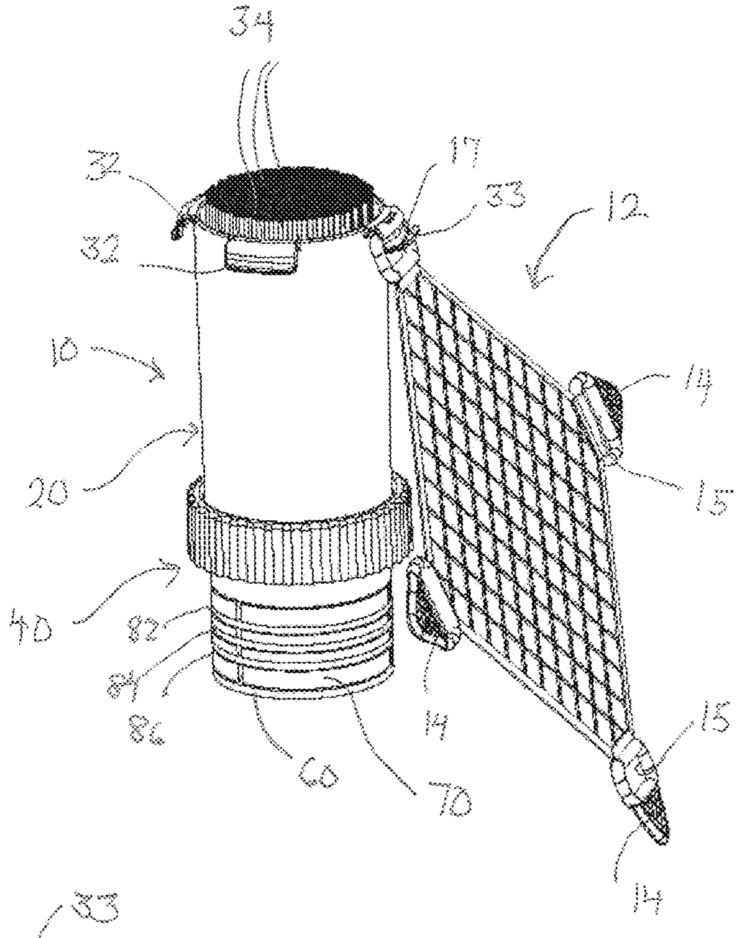
FIG. 1 is a perspective view of a tool holder assembly together with a containment net illustrated in a taut non-operative configuration.
Figure 2:
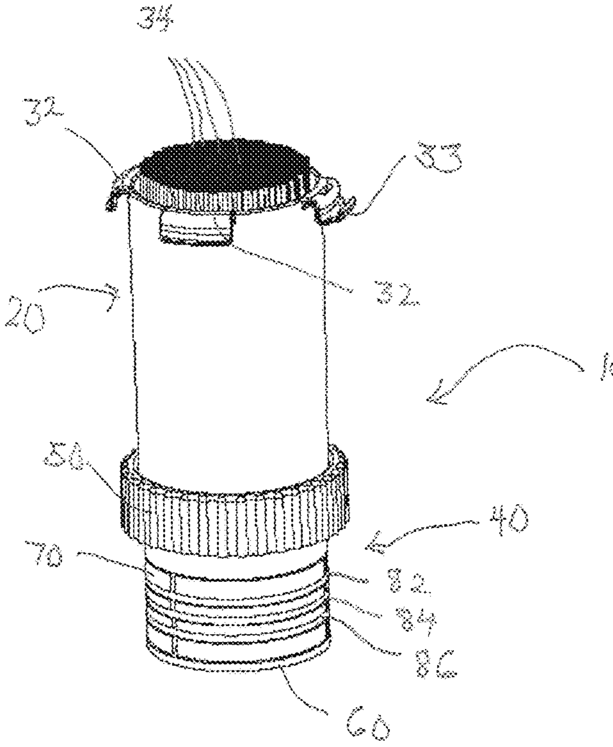
FIG. 2 is a perspective view of the tool holder assembly of FIG. 1.
Figure 4:
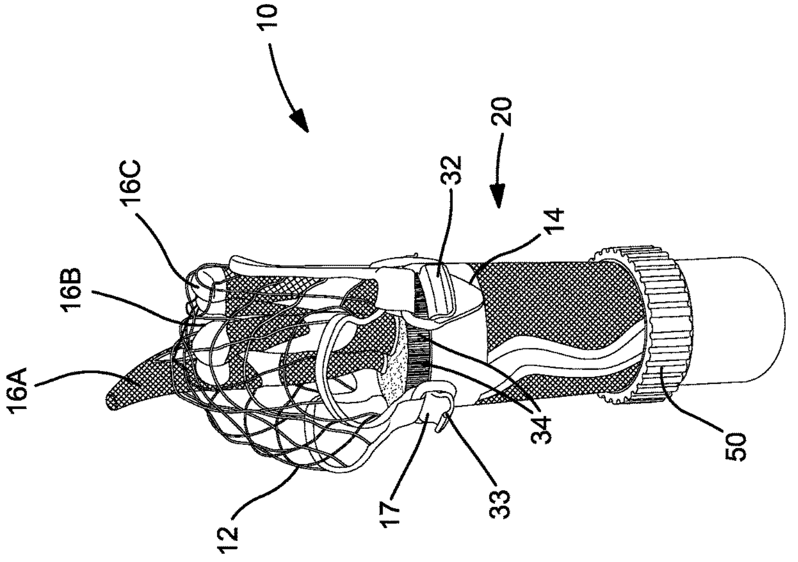
FIG. 4 is a photograph of the tool holder assembly and tools of FIG. 3 with the containment net secured in place and the tool holder assembly installed in a representative closed cylindrical structure.
Figure 3:
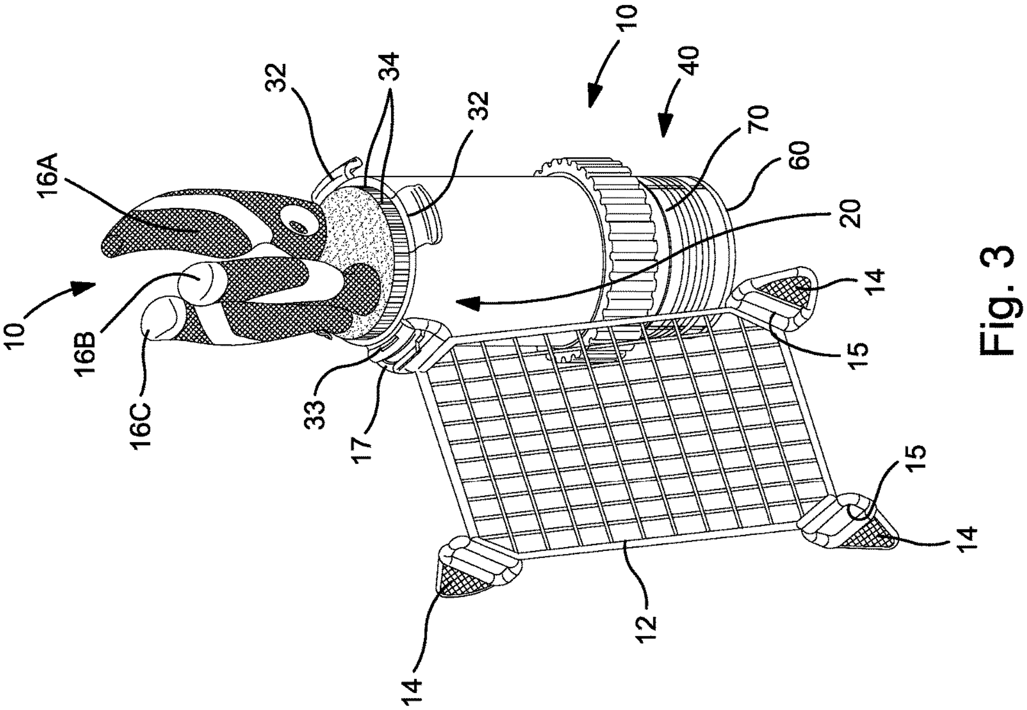
FIG. 3 is a perspective view of the tool holder assembly of FIG. 1, together with the containment net in a taut configuration and representative tools being received in the holder assembly.

The tool holder 10 is configured for installation and securement in a cup holder (not illustrated) which is typically provided in the watercraft (or other structures), and preferably together with a flexible containment net generally designated by the numeral 12 secures the received tools designated as 16A, 16B and 16C (FIGS. 3, 4) for representation purposes only. The containment net 12 has a flexible nylon construction which is illustrated in FIG. 1 for description purposes only as a taut rectangular configuration formed by corners, three of which each mount a clip 14 having a slot-like opening 15 and a buckle 17 is mounted at a fourth corner.

The tool holder assembly 10 has an upper body 20 which forms a container 22 for receiving the tools and is relatively rotatable with respect to a lower base 40. The body 20 and the base 40 are generally axially symmetric about a central axis A. The base 40, as will be described below, functions to radially expand and/or contract as a result of relative rotation between the body and the base for securing the base and hence the tool holder assembly in a cup holder or similar structure and permitting removal therefrom. In one preferred embodiment, the tool holder assembly 10 can fit into a cup holder having a diametrical dimension from 82 mm to 90 mm, or approximately 3¼ inches to 3½ inches. Naturally, other dimensional capabilities can be implemented.

In the preferred installation, the lower portion of the base 20 is inserted into the cup holder and the base is held with one hand to rotatably fix the base. The body is rotated clockwise to lock or clamp the base to the cup holder. After installation of the tool holder assembly 10 in the cup holder, the tools are then inserted into the body and the containment net 12 is closed over the tools and connected to the body 20 to secure same in the holder assembly. A counter-clockwise rotation will accordingly unlock the base from the cup holder.

Figure 5A:
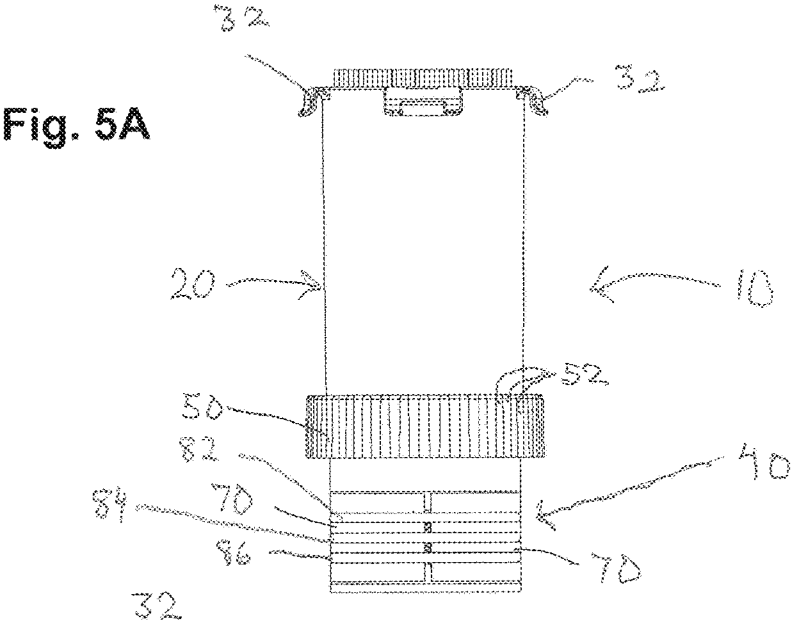
FIG. 5A is a side elevational view of the tool holder assembly in a non-installed mode.
Figure 5B:
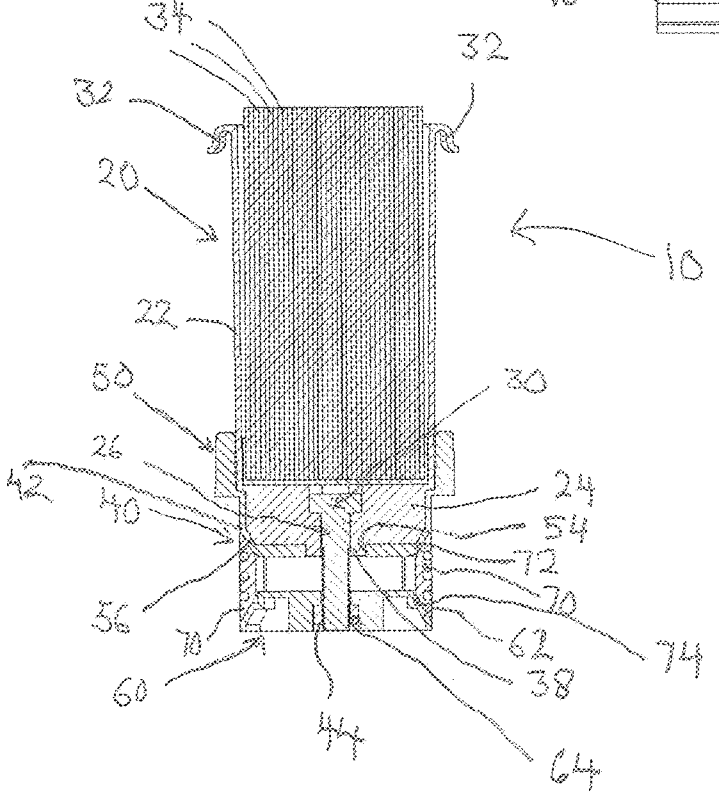
FIG. 5B is a central sectional view of the tool holder assembly of FIG. 5A.
Figure 6A:
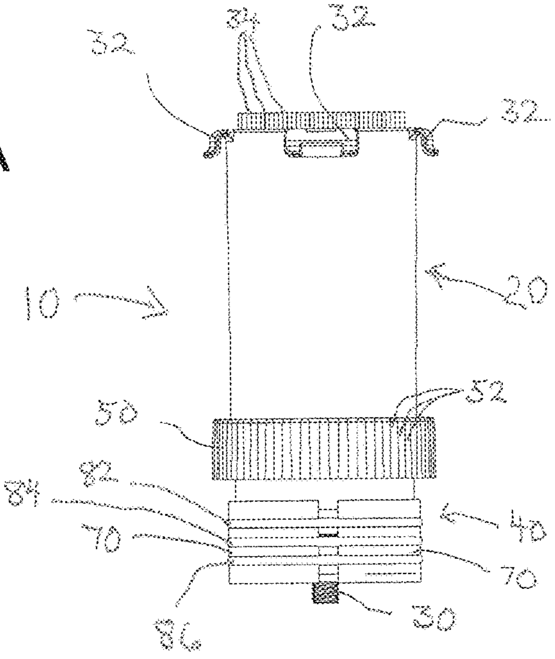
FIG. 6A is an elevational view of the tool holder assembly in an installed mode.
Figure 6B:
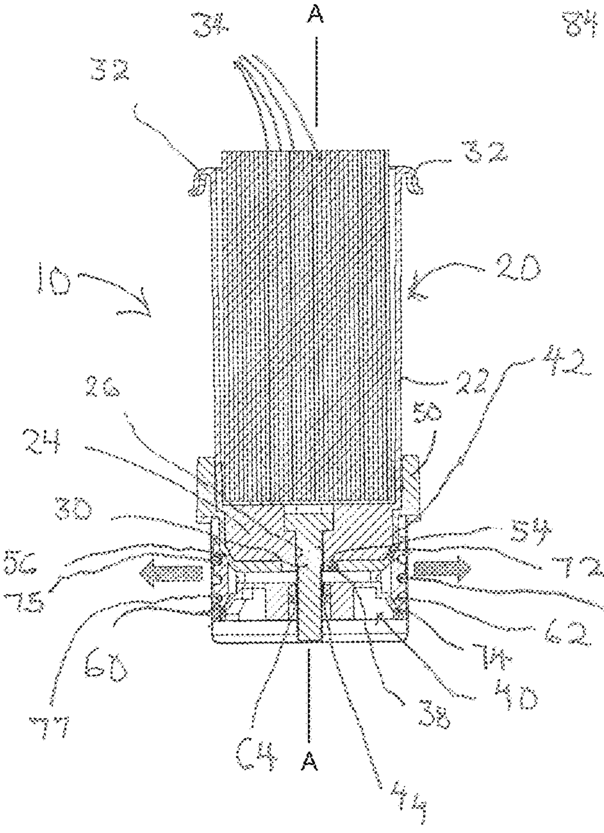
FIG. 6B is a central sectional view, partly diagrammatic, of the tool holder assembly of FIG. 6A.
Figure 7:
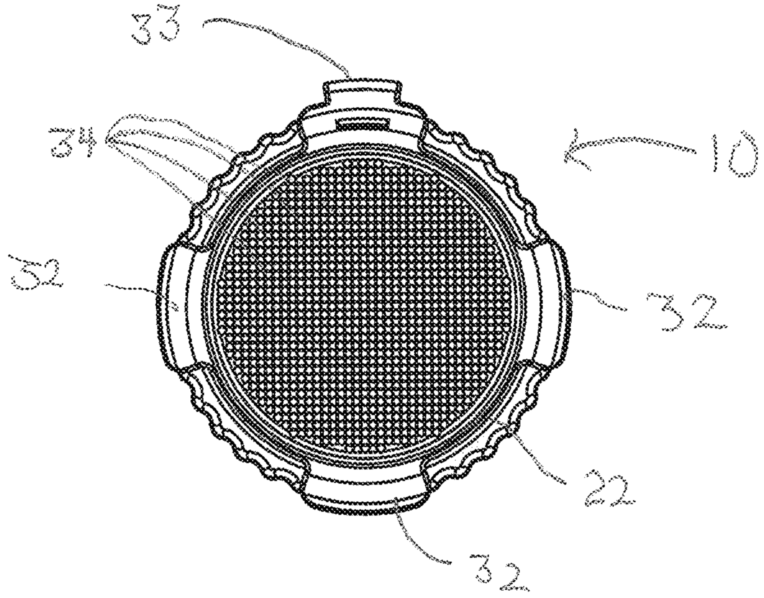
FIG. 7 is a top plan view of the tool holder assembly of FIG. 1.
Figure 8:
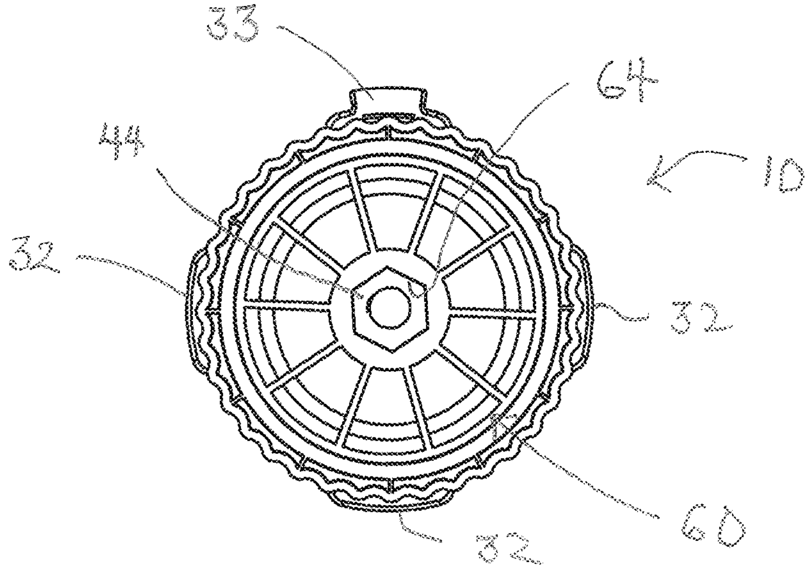
FIG. 8 is a bottom plan view of the tool holder assembly of FIG. 1.

The body 20 comprises a generally cylindrical container 22 which integrally extends from a multi-layer platform 24 (FIGS. 5B, 6B). The platform has a central bore 26 which receives a screw 30. The upper portion of the container 22 includes four angularly spaced retainers with three in the form of downturned hooks 32 and one retainer is in the form of a resilient tab 33. The hooks 32 extend through openings 15 of the clips 14 of the containment net to secure the net 12 to the body 20. Tab 33 captures the buckle 17 in a quasi-permanent connection.

Figure 9:
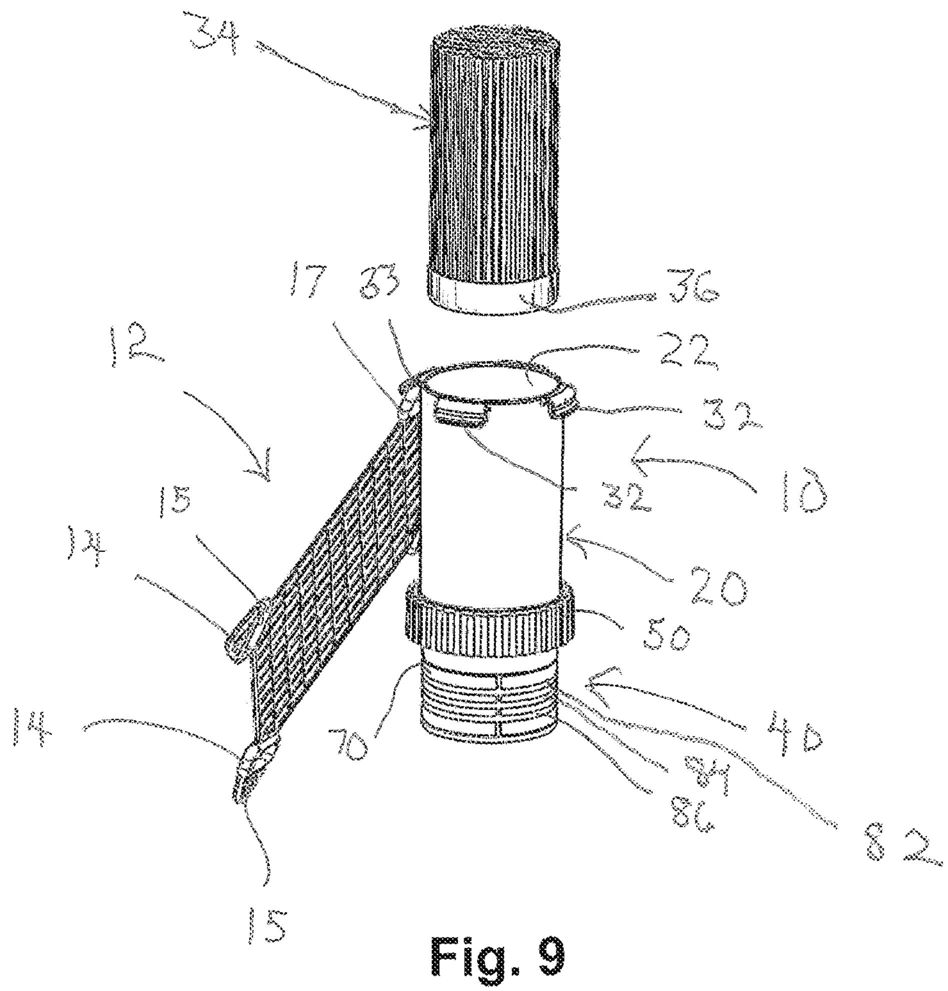
FIG. 9 is a partially exploded perspective view of the tool holder assembly of FIG. 1 with a containment net illustrated in a taut non-operative configuration.

The container 22 also receives a multiplicity of elongated thin plastic rods 34. The rods 34 function so that upon insertion of the tools into the container between various rods, the rods exert a transverse engagement pressure against the tools for frictionally securing same within the container. The rods 34 are received on a tray 36 and extend above the upper rim of the container. As best illustrated in FIG. 9, the rods 34 can be cooperatively grasped and the rods/tray can be removed as a unit for cleaning purposes.

The base 40 includes a cup-like receiver 42 with an upper enlarged ring or annulus 50 which interiorly receives a lower portion of the body. The annulus 50 is exteriorly configured with angularly spaced axial serrations 52 to facilitate the manual grasping of the base. The lower portion of the cup-like receiver 42 integrally extends from the annulus 50 in complementary fashion to the lower portion of the body and includes a central opening 54 through which the threaded portion of the screw 30 and a lower portion of a centering lug 38 of the body projects. A lower portion of the receiver 42 includes a circumferential ramp surface 56 inclined at an angle to the central axis A.

An expansion assembly comprises an actuator wedge 60 having a peripheral ramp surface 62 inclined relative to the central axis and interiorally forming a central hex cavity 64 which receives at a lower portion a hex nut 44 threaded to the shaft of the screw 30. The spacing between ramp surfaces 56 and 62 is thus threadably axially adjustable as a function of the threaded position of the nut 44 on the shaft of the screw 30.

Three substantially identical clamp elements 70 each include upper and lower, inner arcuate ramp surfaces 72 and 74. The clamp elements 70 each have an exterior generally cylindrical arcuate side which is interrupted by three axially spaced arcuate grooves 75, 76, and 77 (FIG. 6B). The clamp elements 70 are angularly arranged about the central axis A and generally align to substantially subtend around the base assembly. The clamp elements 70 are installed so that the upper ramp surface 72 engages the inclined ramp surface 56 and the lower ramp surface 72 engages with ramp surface 62 of actuator wedge 60. Three rubber O-rings 82, 84, and 86 are received in the grooves 75, 76, and 77 respectively, and cooperatively secure the clamp elements 70 to the base. The exterior outer surfaces of the rubber rings 82, 84 and 86 ultimately engage or clamp against the interior side of the cup holder (or related structure).

As best illustrated in FIGS. 6A and 6B, when the body 20 is rotated clockwise relative to the rotatably fixably positioned base assembly, the clamp elements 70 will be forced to move or slide outwardly because of the movement of the wedge 60 axially which forces the clamp elements radially outwardly as indicated by the FIG. 6B arrows. The rings 82, 84 and 86 thus will resultantly engage the interior surface of the cup holder (or related structure).

The rings 82, 84 and 86 provide the frictional engagement to secure the tool holder assembly in position. The relative rotation between the body and the base can be reversed in which case the clamp elements 70 will be allowed to retract inwardly, and the tool holder assembly can be removed from the cup holder.

It will be appreciated that the tool holder assembly 10 is initially installed in the cup holder by a suitable engagement provided by the rings 82, 84 and 86. The tools may then be inserted into the upper container 22. The containment net 12 will then be positioned to cover over the top handles of the tools and secured by the clips 14 so that the hooks 32 extend through the openings 15. The containment net 12 is preferably secured by the buckle 17 permanently to one tab 33 so that the net 12 is quasi-permanently retained to the body. It will be appreciated that there is some resiliency or elasticity to the containment net 12 to provide a sufficient tension for securing the tools within the container. The securement of the tools is also maintained by the rods 42 pressing against the tools.

While a preferred embodiment of the foregoing has been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A tool holder assembly comprising:

a body having an upper container defining a central axis and a lower portion mounting a rotatably fixed axially projecting screw;

a base receiving the lower portion and having a circumferential ring and having a first ramp surface disposed about said axis and an actuator member receiving said screw and axially displaceable therealong and having a second ramp surface disposed about said axis, and a plurality of expansion elements having first and second following surfaces engageable with said first and second ramp members and at least one peripheral O-ring securing said expansion elements to said base;

so that relative rotation between said body and said base causes said expansion elements to be radially displaced by said actuator member and said at least one O-ring to expand or contract radially.

2. The holder assembly of claim 1 wherein said container receives a multiplicity of rods.

3. The holder assembly of claim 1 wherein a plurality of hooks extend from said body.

4. The holder assembly of claim 3 further comprising a net secured to said plurality of hooks and covering said rods.

5. The holder assembly of claim 4 wherein said net further mounts a plurality of clips which engage said hooks.

6. The holder assembly of claim 1 wherein there are three expansion elements.

7. The tool holder assembly of claim 1 wherein there are three rubber O-rings.

8. The tool holder assembly of claim 1 wherein said actuator member carries a rotatably fixed nut which threadably engages said screw.

9. The tool holder assembly of claim 1 wherein each said expansion member has at least one groove which receives a portion of said at least one O-ring.

10. A tool holder assembly comprising:

a body forming an open container receiving a multitude of rods and mounting a plurality of angularly spaced retainers;

a radially expandable base assembly having a first portion receiving said body and a second portion comprising a wedge and a plurality of radially displaceable clamp members engageable by said wedge and peripherally mounting at least one O-ring which secures said clamp members to said base assembly;

a threadable member connecting said body and said base assembly and a second retainer threadably engaged to said threaded member and axially displaceable thereon to axially move said wedge;

wherein relative rotational movement between said body and said base assembly in a first direction forces said clamp members and said at least one O-ring radially outwardly and relative rotation and movement between said body and said base assembly in an opposite second direction allows said clamp members and said at least one O-ring to move inwardly.

11. The tool holder assembly of claim 1 wherein there are three substantially identical radially displaceable clamp members.

12. The tool holder assembly of claim 11 wherein each said radially displaceable clamp member defines three axially spaced grooves and an O-ring is received in each of said channels.

13. A tool holder assembly of claim 10 wherein said body has an upper rim portion and a plurality of angularly spaced hooks extend from said upper rim portion.

14. The tool holder assembly of claim 10 wherein said threadable member is a screw and said second retainer is a nut.

15. The tool holder assembly of claim 10 wherein said base assembly further comprises an enlarged annulus having a plurality of angularly spaced serrations.

16. The tool holder assembly of claim 10 wherein said angularly spaced retainers extend downwardly.

17. The tool holder assembly of claim 10 wherein said rods are received on a tray and upper portions of said rods extend above said container.

18. The tool holder assembly of claim 1 wherein there are three substantially identical radially displaceable expansion elements.

19. The tool holder assembly of claim 18 wherein each said radially displaceable expansion element has an outer surface which defines three axially spaced grooves and an O-ring is received in each of said grooves.

20. A tool holder assembly comprising:

a body forming an open container defining a central axis and mounting a plurality of angularly spaced retainers;

a containment net securable to said retainers and configured to cover said container;

a radially expandable base assembly having a first portion receiving said body and a second portion comprising an axially displaceable wedge and three substantially identical, radially displaceable clamp members engageable by said wedge, each said radially displaceable clamp member having an outer surface which defines three axially spaced grooves and an O-ring received in each said groove;

a threadable member connecting said body and said base assembly and a second retainer threadably engaged to said threaded member and axially displaceable thereon to axially move said wedge;

wherein relative rotational movement between said body and said base assembly in a first direction forces said clamp members radially outwardly, and relative rotation and movement between said body and said base assembly in an opposite second direction allows said clamp members to move radially inwardly.

* * * * *